United States Patent [19]
Voss et al.

[11] Patent Number: 5,735,133
[45] Date of Patent: Apr. 7, 1998

[54] VEHICULAR COOLING SYSTEM WITH THERMAL STORAGE

[75] Inventors: Mark G. Voss, Franksville; Alan P. Meissner; Joseph R. Stevenson, both of Racine, all of Wis.

[73] Assignee: Modine Manufacturing Co., Racine, Wis.

[21] Appl. No.: 631,477

[22] Filed: Apr. 12, 1996

[51] Int. Cl.⁶ .................................................. F25D 17/02
[52] U.S. Cl. .......................... 62/185; 62/59; 62/201
[58] Field of Search .......................... 62/59, 185, 201, 62/216

*Primary Examiner*—William E. Tapoical
*Attorney, Agent, or Firm*—Wood, Phillips, VanSanten, Clark & Mortimer

[57] ABSTRACT

Uncomfortable air temperatures in an air conditioned vehicle immediately following start up of the air conditioning system or when the air conditioning system compressor is being driven at low speeds are avoided in a cooling system including a blower (22) for blowing air into a compartment (10). An air/liquid heat exchanger (30) is located at the outlet (34) of the blower (22) for cooling air received from the blower (22). The system includes a compressor (50), an expansion device (58), a condenser (54) and a liquid/refrigerant evaporator (64) for expanding refrigerant and cooling a liquid coolant which is circulated through a thermal storage device (92) and the heat exchanger (30) by a pump (86). Upon system start up, or when the compressor (50) is being driven at low speed, the coolant is cooled by the thermal storage device (92) to provide a means of cooling air from the blower (22). At all other times, the coolant is cooled by expansion of refrigerant within the evaporator (64) to not only provide a coolant for use in the heat exchanger (30), but a coolant for recharging the thermal storage device (92) as well.

6 Claims, 6 Drawing Sheets

5,735,133

VEHICULAR COOLING SYSTEM WITH THERMAL STORAGE

This invention relates to a cooling system for vehicles, such as automobiles, and more particularly, to such a system that includes a thermal storage device.

BACKGROUND OF THE INVENTION

Recent years have seen an explosion in the use of cooling or air conditioning systems in vehicles such as automobiles, trucks, off-the-road vehicles and the like, particularly in the United States and certain Pacific rim countries. And in Europe, popularity of vehicular air conditioning systems is growing steadily.

Typically, such systems operate on the vapor compression cycle to provide cooled air for cooling the passenger compartment of the vehicle. As is well known, in the usual case, a condenser for a refrigerant is located under the hood of the vehicle just forwardly of the radiator which is employed to cool engine coolant. The condenser receives compressed, hot gaseous refrigerant from a compressor that is driven by the engine of the vehicle when the system is in use. An air stream is flowed through the condenser to cause the refrigerant to condense to a liquid, still at elevated pressure.

From the condenser, the now liquid refrigerant is passed to an expansion device, such as an expansion valve or a capillary, and then to an air/refrigerant evaporator. The evaporator is typically located under the dash of a vehicle and air from either the ambient or the interior of the passenger compartment or a combination of both is passed through the evaporator to be cooled by the expanding refrigerant therein and then into the passenger compartment.

The expanded refrigerant is then ultimately returned to the compressor and the cycle repeated.

While such systems work well for their intended purpose, anyone who has ever entered an automobile on a hot day when the automobile has been standing in the sun for a period of time is fully aware of the fact that such systems do not become effective immediately upon initiation of their operation. There is a substantial lag time between the time that air entering the passenger compartment is cooled by the system and the system is first energized. The length of the lag is dependent upon several factors including engine speed. For example, if, upon initiation of operation of the air conditioning system, the vehicle engine is only idling, or is operated intermittently at low speed as in heavy traffic, it will take much longer to generate an effective amount of cool air for the interior of the passenger compartment than would be the case if the vehicle was operating at highway speeds when the air conditioning system was turned on.

During the lag, occupants of the passenger compartment will be in discomfort. Depending upon whether the vehicle was standing in the sun for a long period of time or was merely being operated with the air conditioning system turned off, there will be a greater or lesser degree of discomfort. In the case of the former, the discomfort will be substantial as the interior of the passenger compartment would not unexpectedly be at levels 30°–50° Fahrenheit above the ambient temperature. And, of course, all furnishings within the passenger compartments are likely to be at such an elevated temperature and thus extremely warm to the touch, causing discomfort when contact is made with them.

Thus, there is a real need for a means to eliminate or minimize the lag in achieving effective cooling upon the initiation of operation of a vehicular cooling or air conditioning system.

SUMMARY OF THE INVENTION

It is a principal object of the invention to provide a new and improved cooling or air conditioning system for a vehicle. More particularly, it is an object of the invention to provide such a system wherein the lag between initiation and operation of the system and the provision of an effective amount of cooled air to a point of use is minimized.

According to one embodiment of the invention, the foregoing object is achieved in a cooling system that includes a blower having an outlet for directing air into a compartment such as a passenger compartment. An air/liquid heat exchanger is provided and has a first heat exchange fluid flow path connected to the outlet and a second heat exchange fluid flow path in heat exchange relation to the first flow path. A refrigerant compressor along with an expansion device and a condenser are also provided. A liquid/refrigerant evaporator is connected into the system and has a refrigerant flow path that receives refrigerant from the expansion device and which discharges to the compressor along with a liquid flow path in heat exchange relation with the refrigerant flow path. Means are provided for connecting the liquid flow path in circuit with the second heat exchange fluid flow path to establish a coolant circuit and means are provided for circulating a liquid coolant in the coolant circuit. The system includes a rechargeable thermal storage device located in the coolant circuit which absorbs heat from the coolant when the coolant is above a predetermined temperature and which rejects heat to the coolant when the coolant is below a predetermined temperature.

In another embodiment, the system further includes an air/refrigerant evaporator having a refrigerant flow path connected to receive refrigerant from the condenser and to discharge refrigerant to the compressor along with an air flow path in heat exchange relation with the refrigerant flow path and connected to receive air from the outlet of the blower and discharge it into the compartment. According to this embodiment, the air/refrigerant evaporator works in concert with the air/liquid heat exchanger to jointly cool air being discharged into the compartment.

Other objects and advantages will become apparent from the following specification taken in connection with the accompanying drawings.

DESCRIPTION OF THE PREFERRED EMBODIMENTS

Figure 1:
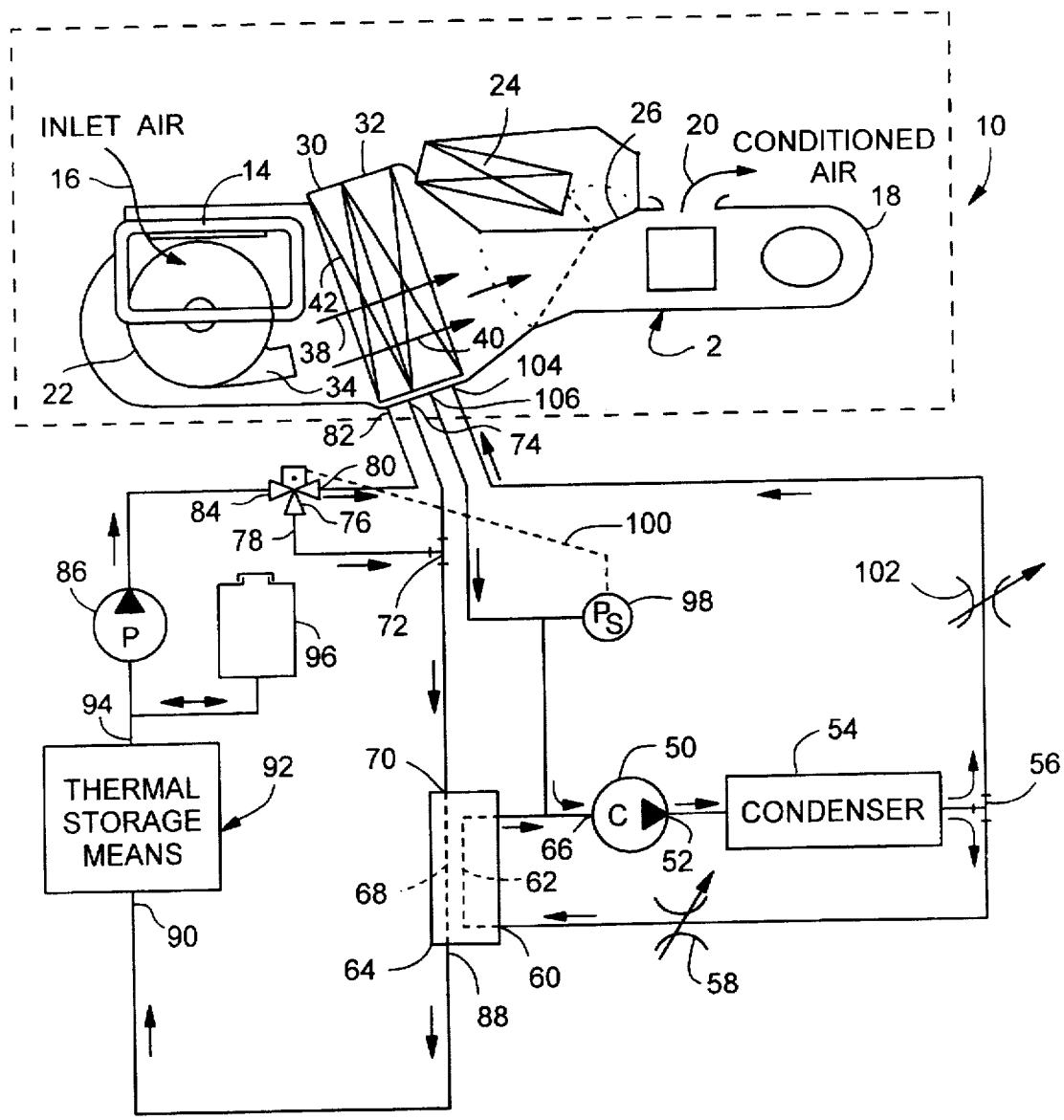
FIG. 1 is a somewhat schematic view of one embodiment of a cooling system made according to the invention.

An exemplary embodiment of a vehicular cooling system made according to the invention is illustrated in FIG. 1 and with reference thereto is utilized in connection with a compartment, schematically shown in dotted lines and generally designated 10. The compartment may be a passenger compartment or any other sort of a compartment that requires cooling.

In the exemplary embodiment, which relates to an automobile, the automobile dash duct is shown somewhat schematically and generally designated 12. The same includes an inlet 14 for air to be heated or cooled as shown by an arrow 16 and outlets 18 (only one of which is shown) for conditioned air as shown by an arrow 20.

A blower 22 discharges air from the inlet 14 into the dash duct 12 as is well known. Ultimately, such air will be discharged into the compartment 10 through the outlets 18.

A conventional heater core 24 is located within the duct 12 and associated therewith is a so-called blend air door 26 movable between the solid and dotted line positions illustrated in FIG. 1. As is well known, the position of the blend air door 26 may be changed to regulate the air flow through the heater core 24 to provide a measure of control over the temperature of air being discharged through the outlets 18.

Also contained within the dash duct 12 is an air/liquid heat exchanger 30 and an air/refrigerant evaporator 32. The two are located in side by side relation at a location between the blend air door 26 and the outlet 34 of the blower 22. Each includes a first heat exchange fluid or air flow path schematically designated by arrows 38 and 40 respectively through which air from the blower 22 flows towards the outlets 18. The air/liquid heat exchanger 30 includes an internal, liquid flow path designated by an "X" 42 which is in heat exchange relation with the air flow path 38. The air/refrigerant evaporator 32 also includes a second fluid flow path, also shown by an "X" designated 44 which is in heat exchange relation with the air flow path 40. A liquid coolant is flowed through the flow path 42 while an expanding refrigerant is flowed through the flow path 44.

The system also includes an engine driven compressor 50 which may be of conventional construction. The compressor outlet 52 discharges into a conventional condenser 54 which will be conventionally located just ahead of the radiator under the hood of the vehicle.

The condenser 54 discharges to a T 56. One branch of the T extends to an expansion device 58 which may be in the form of a conventional expansion valve or capillary. The expansion device 58 in turn is connected to the inlet 60 of an internal refrigerant flow path 62 of a liquid/refrigerant evaporator 64. The refrigerant flow path 62 is then connected back to the suction side 66 of the compressor 50.

Of course, other components conventionally found in vapor compression systems will also be employed as required.

Returning to the liquid/refrigerant evaporator 64, the same includes an internal liquid flow path 68 in heat exchange relation with the refrigerant flow path 62. An inlet 70 to the flow path 68 is connected to a T 72. One side of the T 72 is connected to the outlet 74 of the liquid flow path 42 of the air/liquid heat exchanger 30. The other branch of the T 72 is connected to an electrically operated three-way valve 76, and specifically to a port 78 thereof.

The three-way valve 76 has a further port 80 which is connected to the inlet 82 of the liquid flow path 42 of the air/liquid heat exchanger 30 and a third port 84 which is connected to the outlet of a pump 86 which preferably is driven off of the electrical system of the vehicle in which the system is installed.

The outlet 88 of the liquid flow path 68 in the liquid/refrigerant evaporator 64 is connected to the inlet 90 of a rechargeable thermal storage device, generally designated 92. The thermal storage device 92 includes an outlet 94 which is connected to the inlet side of the pump 86. Also connected to the inlet side of the pump 86 is a coolant reservoir and expansion tank 96.

It will be appreciated that the liquid flow path 68 of the liquid/refrigerant evaporator 64 together with the three-way valve 76, the air/liquid heat exchanger 30, the pump 86 and the thermal storage device 92 define a circuit for the circulation of a coolant. Typically, the coolant used will be an ethylene glycol solution although any other type of coolant that will not freeze at temperatures-experienced in the ambient in which the system is used or in the liquid/refrigerant evaporator 64 may be used.

The line extending between the three-way valve 76 and the T 72 acts as a bypass loop whereby, by switching the three-way valve 76, the air/liquid heat exchanger 30 may be shut out of the circuit and bypassed.

The system includes an electrical pressure switch 98 connected to the suction side of the compressor 50. The pressure switch 98 is connected by electrical circuitry shown schematically at 100 to the three-way valve 76 to control the same as will be explained hereinafter.

Returning to the T 56, the remaining branch of the same is connected to a second expansion device 102 which may also be in the form of an expansion valve or a capillary. The second expansion device is connected to the inlet port 104 of the refrigerant flow path 44 of the air/refrigerant evaporator 32. The outlet port 106 from the flow path 44 is returned to the suction side 66 of the compressor 50.

The thermal storage device 92 is generally of the type disclosed in U.S. Pat. No. 5,054,540 issued Oct. 8, 1991, and U.S. Pat. No. 5,277,038, issued Jan. 11, 1994, both to Peter Carr, the disclosures of both of which are herein incorporated by reference. As will be apparent from the Carr patents, the thermal storage device 92 is made up of several cells, each of which contains a mixture of water, a liquified gas, and movable spheres. In the embodiments of this invention, the gas employed is refrigerant R134a and, of course, water is included. The quantity of R134a contained in each cell is equal to 6.7 grams. Each cell also contains 22.1 grams of a solution of 0.53 grams dodecyl alcohol and 0.53 grams sodium lauryl sulfate in water, 1 gram of fine sand, one ⅛" diameter alumina sphere and one ⁵⁄₁₆" diameter Zirconia sphere. A total of 173 cells are included in the thermal storage device 92 and they may be configured as disclosed in the previously identified Carr patents.

As can be ascertained from the previously identified Carr patents, the gas, R134a, and the water are capable of forming a gas hydrate at a transition temperature above 32° F. With the particular materials used in the quantities listed above in the thermal storage device 92, this temperature is approximately 43° F.

When the thermal storage device 92 is fully charged, each cell will contain the gas hydrate and when a fluid at a temperature in excess of 50° F. is passed over the cells, heat will be rejected from the fluid to the cells, causing the gas hydrate to disassociate into gas and water, absorbing the heat of fusion. Conversely, if the fluid passed over the cells is at a temperature less than 43° F., the water and gas mixture will reject heat to the fluid and transition to the gas hydrate. Consequently, the thermal storage device 92 acts as a cool storage device.

Assuming that the thermal storage device 92 is fully charged, that is, the entirety of its contents of water and R134a is in the form of the gas hydrate, and the cooling system illustrated in FIG. 1 is energized, a number of things occur. Firstly, the compressor 50 will begin to compress refrigerant and provide the same to the condenser 54.

Condensed refrigerant will ultimately be provided to the T 56 from which it will flow to both of the expansion devices 58 and 102. The refrigerant passing the expansion device 102 will expand within the air/refrigerant evaporator and cool air passing through the same through the flow path 40 from the blower 22 to the outlets 18. Initially, as is well known, very little heat will be rejected from the air directed by the blower 22 to the refrigerant expanding in the air/refrigerant evaporator 32 with the consequence that there will be very little cooled air 20 entering the compartment 10 at this tires if only the air/refrigerant evaporator 32 was operating because of the finite amount of time required to build up sufficient refrigerant pressure in the system, particularly if the compressor 50 is engine driven and the engine is at idle.

Accordingly, the pressure switch 98, which is responsive to the pressure at the suction side 66 of the compressor 50, will operate tile three-way valve 76 to flow coolant to the port 82 of the air/liquid heat exchanger 30 while cutting off the bypass loop from the valve port 78. The pump 86 is energized at this time and as a consequence, coolant will flow through the circuit including the thermal storage device 92, and the heat exchanger 30. Within the heat exchanger 30, the air from the blower 22 will reject heat to the coolant which has been cooled as a consequence of passing through the thermal storage device 92 to result in the provision of cold air at the outlet 18 even though very little refrigerant may be evaporating within the air/refrigerant evaporator 32 at the time.

Returning to the condenser 54 and the T 56, the condensed refrigerant stream from the condenser 54 is split at the T 56 and also passes to the expansion device 58 as mentioned previously. From there, it passes to the refrigerant flow path 62 within the liquid/refrigerant evaporator 64. As coolant has been warmed within the heat exchanger 30 passes to the liquid/refrigerant evaporator 64, evaporation that will begin to occur within the flow path 62 will cool the coolant flowing in the flow path 68 with the consequence that coolant at a temperature below 43° F. will ultimately be passed through the thermal storage device 92 to recharge the same.

Once the thermal storage device 92 has been fully charged, depending upon system parameters, the pump 86 may continue to operate to drive the coolant, still being cooled within the liquid/refrigerant evaporator 64, to the heat exchanger 30 so that both the heat exchanger 30 and the evaporator 32 are acting to cool the air from the blower 22.

Conversely, if the compressor 50 is being driven at a relatively high rate by the engine, as evidenced by low pressure at its suction side 66 (the pressure at the suction side 66 is inversely proportional to the speed of the compressor 50, i.e., engine speed), the pressure switch 98 may switch the valve 76 to cutoff off flow through the heat exchanger 30 and direct it through the bypass loop. In this configuration, the system is ideally set-up for a rapid recharging of the thermal storage device 92 since the entire cooling capacity delivered by the liquid/refrigerant evaporator 64 is delivered solely to the thermal storage device 92.

Figure 2:
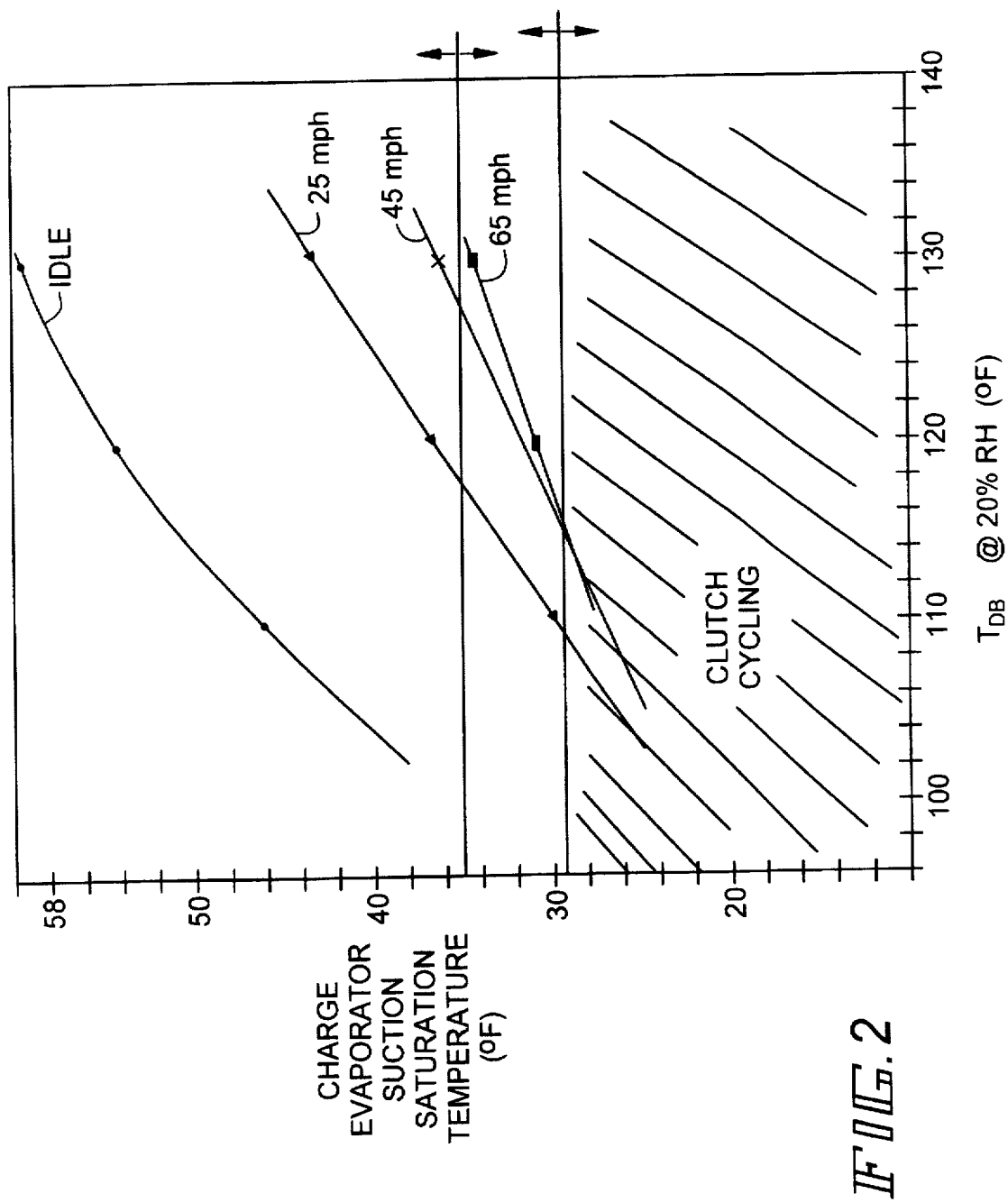
FIG. 2 is a graph contrasting dry bulb temperature in degrees fahrenheit at 20° relative humidity with the temperature of a coolant used to charge a thermal storage device in the invention in degrees fahrenheit at the saturation temperature at the suction side of the compressor for various engine speeds expressed as over the road speeds.

FIG. 2 illustrates test data derived through use of the system in a 1994 Jeep Grand Cherokee which was equipped with a conventional subsystem for disengaging the compressor 50 from the engine when pressures at the suction side 66 of the compressor 50 were indicative of saturation temperatures of the refrigerant below 29° F. It will be observed that ambient temperatures from approximately 100° on up, with the engine at idle speed, the thermal storage device 92 cannot be charged as the saturation temperature curve does not fall below 35°. At the same time, charging of the thermal storage device 92 can occur at one engine speed corresponding to a vehicle speed of 25 miles per hour at temperatures from approximately 118° down to approximately 109° when the conventional cut-off system declutches the compressor. At 45 miles per hour, charging can occur from 128° down to approximately 115° where declutching occurs. At engine speeds corresponding to a 65 mile per hour vehicle speed, charging will occur from about 132° and lower until declutching is achieved.

Figure 3:
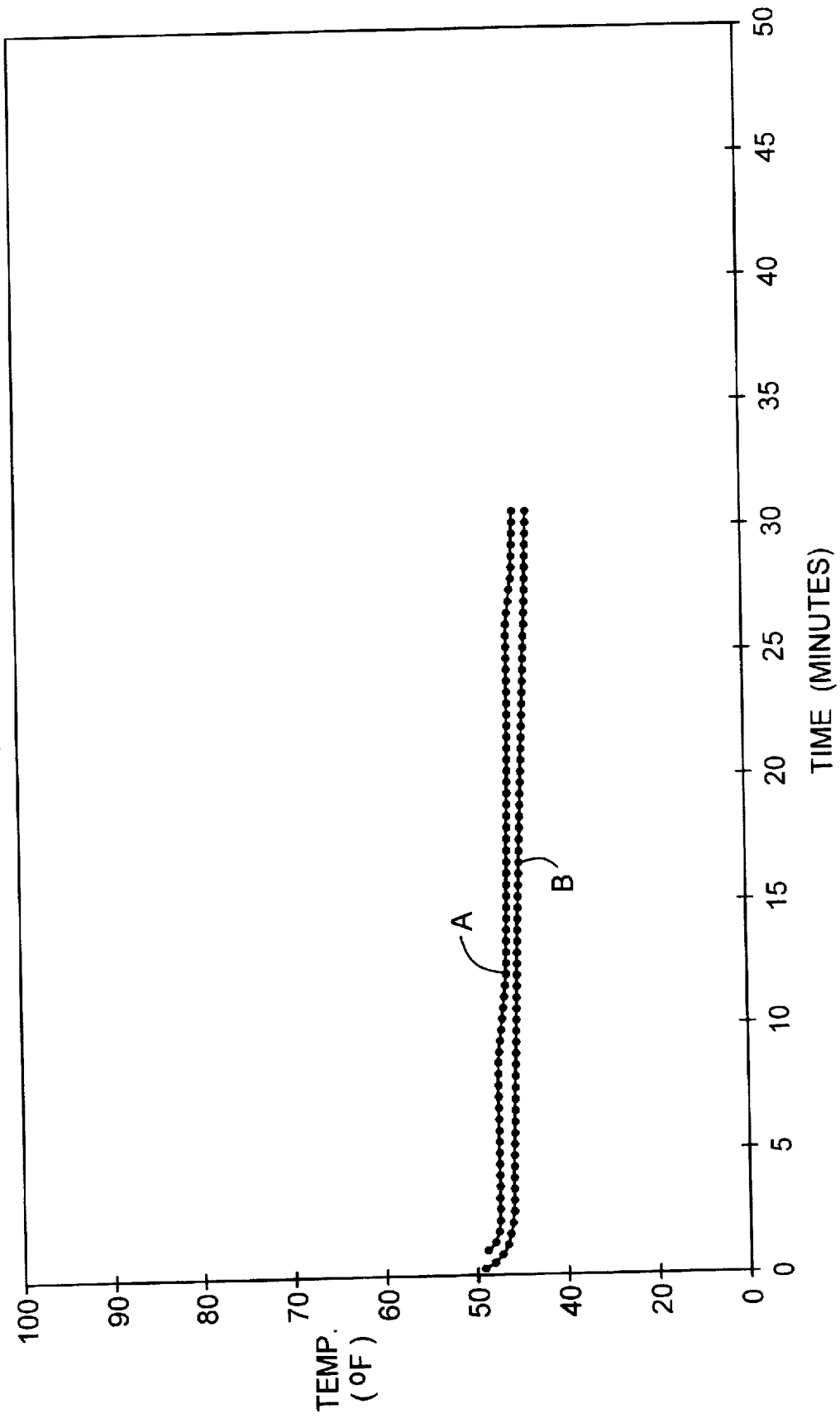
FIG. 3 compares the temperature of air being discharged into a passenger compartment over a time period of 30 minutes during the charging of a thermal storage device used in the invention against a conventional vehicular cooling system.

FIG. 3 illustrates two curves which illustrate the impact of charging the thermal storage device 92 on the temperature of cooled air being discharged from the center port of a dash in the 1994 Jeep Grand Cherokee having a system installed therein. The upper curve, labelled "A", illustrates the temperature from the beginning of a charge cycle to the end of a charge cycle approximately 30 minutes later while the "B" curve illustrates a temperature of the air over the same period if the charging part of the system is disabled. In general, the difference is only about 4° or 5° F. so that the impact of charging the thermal storage device 92 is relatively small.

Figure 4:
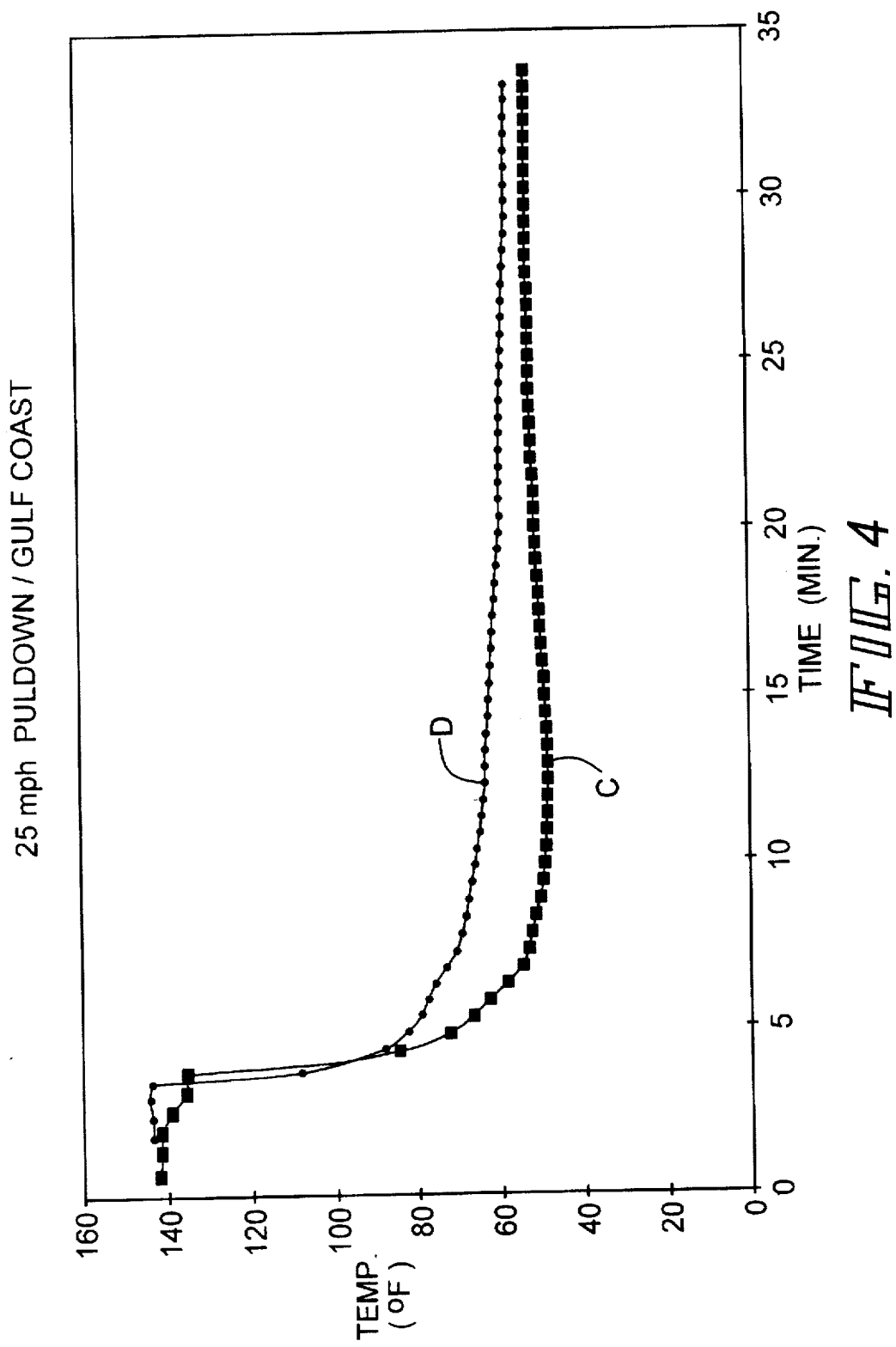
FIG. 4 illustrates the temperature of air being discharged into a compartment by both a system made according to the invention and a conventional automobile cooling system in degrees fahrenheit versus time following initiation of operation of the system in a vehicle being driven at 25 miles per hour.

FIG. 4 illustrates the difference on temperature achieved through use of the invention (Curve C) versus the conventional cooling system (Curve D) of the same vehicle. It will be observed that at times in the cycle, almost a 20° F. temperature differential between the system of the invention and the conventional system exists, thereby demonstrating the ability of the system of the invention to more rapidly cool the passage or compartment[1]. The data in FIG. 4 is that obtained when the vehicle engine speed was sufficient to drive the vehicle at 25 miles per hour.

Figure 5:
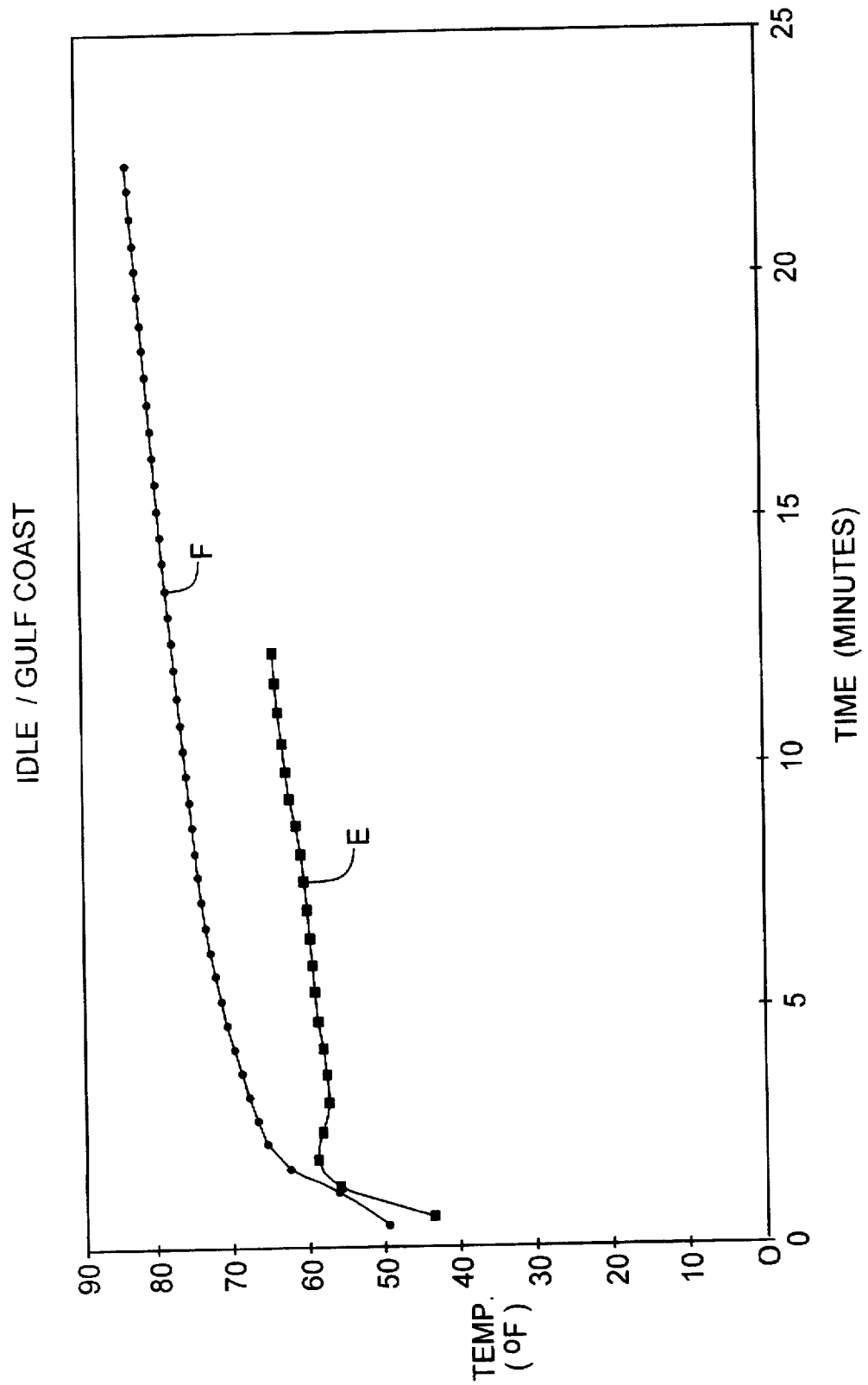
FIG. 5 is a similar comparison but with the vehicle engine at idle speed.

FIG. 5 illustrates the air temperature for a cooling system made according to the invention (Curve E) versus the conventional cooling system (Curve F) when the engine was set to idle speed after the vehicle had been driven for at least one half hour at highway speeds so as to fully charge the thermal storage device 92. Here, a 12°–15° F. temperature differential was maintained for in excess of ten minutes, showing the ability of the system to provide adequate cooling even with the compressor being driven at a relatively low speed.

Figure 6:
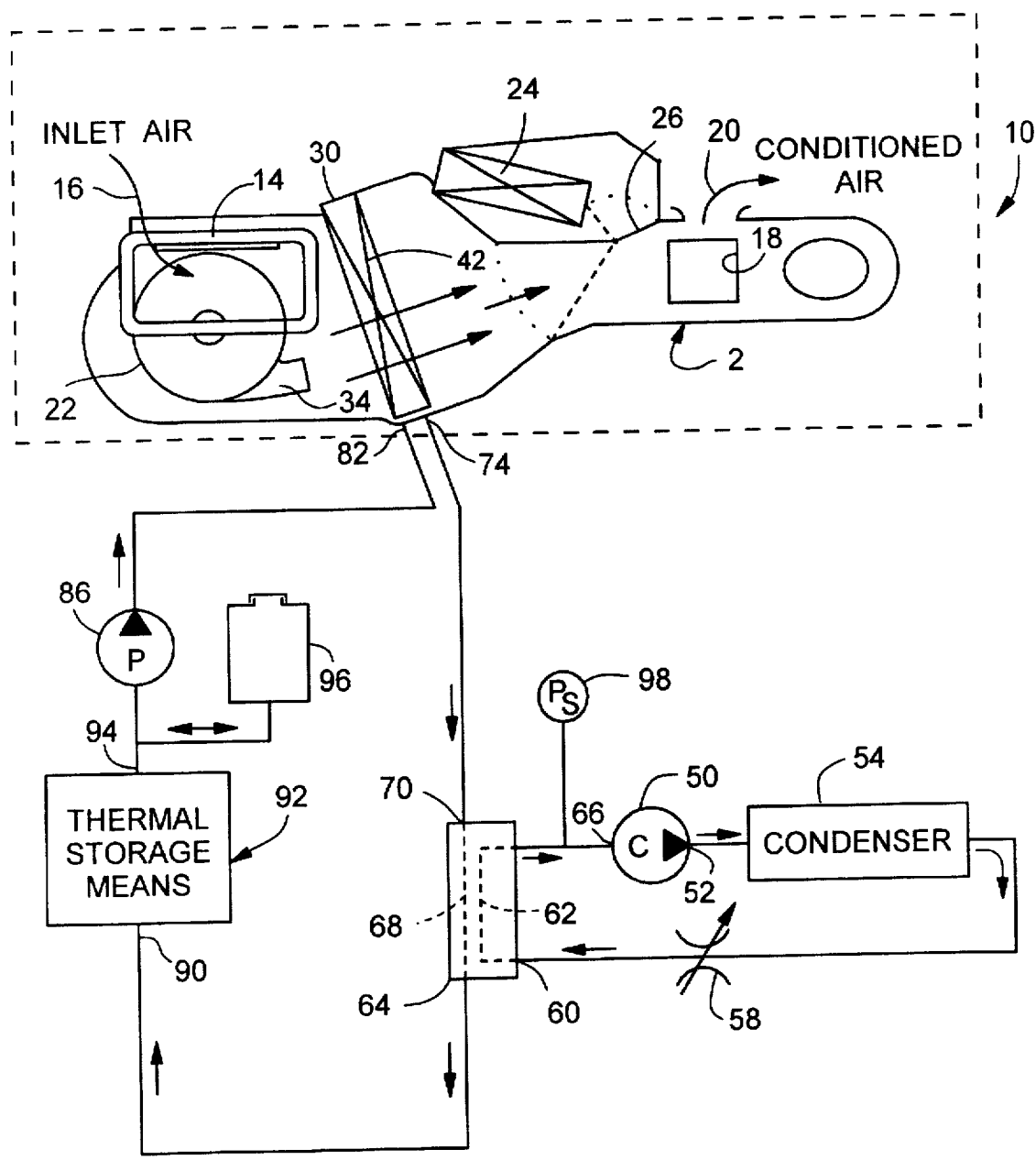
FIG. 6 is a somewhat schematic view of a modified embodiment of the invention.

FIG. 6 illustrates a modified embodiment of the invention, in some ways, the embodiment of FIG. 6 is preferred since it is less complex: and therefore less expensive than the embodiment shown in FIG. 1. Furthermore, because the embodiment of FIG. 6 does not include an air/refrigerant evaporator, freeze up and frost build-up are no longer concerns, enabling the system to operate at lower suction pressures. The lower suction pressures can be used to offset efficiency losses encountered with this embodiment. However, the embodiment of FIG. 1 may be preferred in other instances because, as a result of its construction, it operates more efficiently than the embodiment shown in FIG. 6.

For simplicity, like components in the two embodiments are given like reference numerals.

In essence, the embodiment of FIG. 6 eliminates the air/refrigerant evaporator 32 and the connecting piping to the compressor 50, condenser 54 as well as the expansion device 102. Also eliminated is the three-way valve 76 and the bypass loop for the air/liquid heat exchanger 30 it creates.

In this system, once it is initially activated, coolant is circulated by the pump 86 through the heat exchanger 30 to cool air from the blower 22 before it is discharged into the compartment 10 from the outlets 18. Because very little cooling will be available due to operation of the compressor 50 initially, when the system is first activated, the cooling capacity results from the cooling of the coolant within the thermal storage device 92.

As the system operation progresses and the compressor 50 is compressing and circulating sufficient refrigerant to carry the cooling load, the cooling of the coolant within the liquid/refrigerant evaporator 64 will not only be sufficient for adequate operation of the heat exchanger 30 to cool air from the blower 22, it will also recharge the thermal storage device 92 as it passes therethrough on its way from the evaporator 64 to the heat Exchanger 30.

From the foregoing, it will be appreciated that a cooling system made according to the invention promptly responds to activation of an air conditioning system as well as to insufficient compressor speed to provide adequate cooling as, for example, when an engine driven compressor in a vehicle air conditioning system is operated at low speed as at engine idle. The system provides for recharging using existing capacity of a conventional air conditioning system for the vehicle while having only a small effect on the temperature of the cool air being discharged into an engine compartment during such recharging.

As a consequence, comfort to people within the passenger compartment or the like is maximized by reduced exposure to uncomfortable hot air and/or air that is inadequately cooled as a result of inadequate cooling capacity due to low engine speeds.

We claim:

1. A cooling system for a compartment of a vehicle comprising:

a blower having an outlet for directing air into a compartment;

an air/liquid heat exchange having a first heat exchange fluid flow path connected to said outlet and a second heat exchange fluid flow path in heat exchange relation to said first flow path:

a refrigerant compressor;

an expansion device;

a condenser connected between said compressor and said expansion device;

a liquid/refrigerant evaporator connected between said expansion device and said compressor oppositely of said condenser, said evaporator having a refrigerant flow path receiving refrigerant from said expansion device and a liquid flow path in heat exchange relation with said refrigerant flow path;

means connecting said liquid flow path in circuit with said second heat exchange fluid flow path to establish a coolant circuit;

means for circulating a liquid coolant in said coolant circuit; a rechargeable thermal storage device in said coolant circuit, said storage device absorbing heat form said coolant when said coolant is above a predetermined temperature and rejecting heat to said coolant when said coolant is below a predetermined temperature;

an air/refrigerant evaporator having a refrigerant flow path connected to receive refrigerant from said condenser and to discharge refrigerant to said compressor at an airflow path in heat exchange relation with said refrigerant flow path connected to receive air from said outlet and discharge it into the compartment;

a bypass loop in said coolant circuit for bypassing said air/liquid heat exchanger;

a valve for selectively opening or closing said bypass loop;

a pressure sensor located between said compressor and said evaporators; and a means responsive to said pressure sensor for operating said valve.

2. The cooling system for a compartment of a vehicle of claim 5 further including a coolant reservoir connected to said coolant circuit.

3. The cooling system for a compartment of a vehicle of claim 1 wherein said valve is a three-way valve.

4. The cooling system for a compartment of a vehicle of claim 1 wherein said predetermined temperatures are different temperatures.

5. The cooling system for a compartment of a vehicle of claim 1 wherein said pressure sensor is a pressure switch connected to the suction side of said compressor.

6. The cooling system for a compartment of a vehicle of claim 5 wherein said pressure switch is operable to operate said valve to close said bypass loop for relatively high pressures at the suction side of said compressor and further operable to open said bypass loop and halt flow through said air/liquid heat exchanger for relatively low pressures at the suction side of said compressor.

* * * * *